United States Patent
Ashibe

(10) Patent No.: US 7,800,000 B2
(45) Date of Patent: Sep. 21, 2010

(54) SUPERCONDUCTING-CABLE CORE AND SUPERCONDUCTING CABLE

(75) Inventor: Yuichi Ashibe, Osaka (JP)

(73) Assignee: Sumitomo Electric Industries, Ltd., Osaka-shi, Osaka (JP)

(*) Notice: Subject to any disclaimer, the term of this patent is extended or adjusted under 35 U.S.C. 154(b) by 65 days.

(21) Appl. No.: 11/917,581

(22) PCT Filed: Apr. 3, 2007

(86) PCT No.: PCT/JP2007/057448

§ 371 (c)(1),
(2), (4) Date: Dec. 14, 2007

(87) PCT Pub. No.: WO2007/119655

PCT Pub. Date: Oct. 25, 2007

(65) Prior Publication Data

US 2009/0082210 A1    Mar. 26, 2009

(30) Foreign Application Priority Data

Apr. 13, 2006    (JP) .............................. 2006-111032

(51) Int. Cl.
*H01B 12/00* (2006.01)
(52) U.S. Cl. .................................. 174/125.1; 174/15.4
(58) Field of Classification Search ............. 174/125.1, 174/15.4, 15.5; 257/661–663; 505/230–232, 505/704
See application file for complete search history.

(56) References Cited

U.S. PATENT DOCUMENTS 6,342,672 B1 * 1/2002 Kaneko et al. ............. 174/15.5
6,972,376 B2 * 12/2005 Hughey et al. ........... 174/125.1
2005/0217878 A1 * 10/2005 Ashibe et al. .............. 174/15.5
2008/0164048 A1 * 7/2008 Hirose ....................... 174/15.5

FOREIGN PATENT DOCUMENTS

| JP | 09-055241 | 2/1997 |
| JP | 2005-100777 | 4/2005 |
| JP | 2005-210834 | 8/2005 |
| JP | 2006-059695 | 3/2006 |
| JP | 2006-114342 | 4/2006 |

* cited by examiner

*Primary Examiner*—Jinhee J Lee
*Assistant Examiner*—Yuriy Semenenko
(74) *Attorney, Agent, or Firm*—Drinker Biddle & Reath LLP

(57) ABSTRACT

The invention offers a superconducting-cable core that comprises a superconducting conductor and an insulating layer covering the outer circumference of the superconducting conductor. The superconducting-cable core is classified longitudinally into a cable portion and a jointing-structure-forming portion that is located at each end of the cable portion and that serves as the portion in which a complementary insulating structure is formed when jointed with another conducting member. Of the superconducting-cable core, the jointing-structure-forming portion is at least within the range from the end of the superconducting-cable core to the end of the complementary insulating structure. The jointing-structure-forming portion has an insulating layer whose insulation performance is higher than that of the insulating layer of the cable portion, so that even when the cable itself cannot be designed with a sufficient margin in its insulation, a highly reliable joint can be formed.

10 Claims, 6 Drawing Sheets

SUPERCONDUCTING-CABLE CORE AND SUPERCONDUCTING CABLE

TECHNICAL FIELD

The present invention relates to a superconducting-cable core and a structure of a superconducting cable incorporating the superconducting-cable core. In particular, the present invention relates both to a superconducting-cable core having a good electric insulation performance in an intermediate joint, which joints superconducting cables with one another, and a termination joint, which joints a superconducting cable with another electric-power apparatus, and to a structure of a superconducting cable incorporating the superconducting-cable core.

BACKGROUND ART

In recent years, researchers and engineers have proposed to use, as a power cable, a superconducting cable, which has a higher transmission capacity than a normal-conduction cable. As the superconducting cable, for example, a superconducting cable may have a structure in which three superconducting-cable cores are twisted together and housed in a heat-insulated pipe, as stated in Patent literature 1.

Each of the superconducting-cable cores comprises, from the center in the following order, a former, a superconducting conductor, an insulating layer, an outer conductor layer, and a protecting layer. Usually, both of the superconducting conductor and the outer conductor layer are formed of superconducting wires. The insulating layer is formed by helically lapping insulating paper to secure a desired electric insulation performance. The superconducting conductor, insulating layer, and outer conductor layer each have a uniform thickness along the entire length of the cable core.

The heat-insulated pipe has a dual-pipe structure composed of an inner pipe and an outer pipe, between which a heat-insulating material is placed. The space in the dual pipe is evacuated in a vacuum. An anticorrosion covering is formed at the outside of the heat-insulated pipe. In the foregoing superconducting cable, usually, the space enclosed by the inner pipe and the cable cores becomes a channel for a coolant.

The superconducting-cable core contracts on account of the cooling to an extremely low temperature by the coolant. The contraction exercises a tension on the superconducting wires, damaging the superconducting wires in some cases. Consequently, in a multicore superconducting cable, an allowance for contraction of the cable cores is secured by placing the cores in the heat-insulated pipe under the condition that the twisting of the cores is slackened.

When such a superconducting cable is used to construct a power line over a long distance, the following types of joint are required. One is an intermediate joint that joints the cores of adjacent cables with each other at an intermediate position of the line. Another is a termination joint that joints the cable core with another electric-power apparatus (a normal-conduction conductor or another conducting member) at the end of the line. (Hereinafter an intermediate joint and termination joint are simply referred to as a joint). In these joints, the end portion of the superconducting cable is stripped off in the shape of a step to expose the superconducting conductor. Next, the exposed superconducting conductor is connected with another conducting member that is also exposed in the same manner as that for the foregoing superconducting conductor. Subsequently, a complementary insulating structure is formed so as to cover the outer circumference of the exposed conductor and the vicinity of it. Usually, both end portions of the complementary insulating structure are each provided with a stress-relief-cone portion that reduces its diameter as the position moves toward the end to relieve the concentration of the electric field at the joint.

Patent literature 1: the published Japanese patent application Tokukai 2006-59695 (see FIG. 5).

DISCLOSURE OF THE INVENTION

Problem to be Solved by the Invention

Engineers have been studying to install a superconducting cable, in place of a normal-conduction cable, in an existing duct in which a normal-conduction cable is already installed. In view of the above circumstance, it is possible that a superconducting cable has a limitation in its diameter in order that it can be brought into a duct whose diameter is already fixed. Accordingly, the outer diameter of the cable core is also subject to the limitation, so that it is difficult to provide a thick insulating layer. As a result, it is difficult to carry out the insulation design of a cable core itself with a sufficient margin.

When a joint is formed by using the above-described superconducting cable, it becomes further difficult to secure a margin in the insulation design of the joint. In the first place, a joint tends to have an electrically weak point resulting from the concentration of the electric field locally at the place where the end portion of the superconducting-cable core is stripped off in the shape of a step. In particular, the electric field concentrates at the starting-up position of the stress-relief-cone portion in the complementary insulating structure. As a result, a sufficient design margin cannot be achieved at that portion in some cases. Consequently, it has been desired to develop a superconducting cable that enables the formation of a joint having a further increased reliability.

In view of the above circumstances, a main object of the present invention is to offer a superconducting-cable core that enables the formation of a joint having a high reliability even when the cable diameter has a limitation. Another object of the present invention is to offer a superconducting cable incorporating the above-described superconducting-cable core and a superconducting-cable line incorporating the foregoing superconducting cable.

Means to Solve the Problem

The present invention attains the foregoing object by providing the end portion of the cable core with an insulating structure different from that of the other portion.

A superconducting-cable core of the present invention comprises a super-conducting conductor and an insulating layer covering the outer circumference of the superconducting conductor. The superconducting-cable core of the present invention is classified longitudinally into a cable portion and a jointing-structure-forming portion that is located at each end of the cable portion and that serves as the portion in which a complementary insulating structure is formed when jointed with another conducting member. Of the superconducting-cable core, the jointing-structure-forming portion is at least within the range from the end of the superconducting-cable core to the end of the complementary insulating structure. The jointing-structure-forming portion has an insulating layer whose electric insulation performance is higher than that of the insulating layer of the cable portion. The above description explains a feature of the present invention.

The complementary insulating structure is a structure formed by an insulating member covering the outer circumference of both the superconducting conductor exposed by the stripping-off operation in the shape of a step in a jointing portion and the vicinity of the exposed conductor. The complementary insulating structure is formed such that of the outer circumference of the superconducting conductor and insulating layer of the superconducting-cable core, at least the entire portion stripped off in the shape of a step is covered with the complementary insulating structure. The complementary insulating structure usually has a stress-relief-cone portion formed in a tapered shape that decreases its diameter toward each end. The stress-relief-cone portion has a starting-up position (the end of the complementary insulating structure) at the outer circumference of the insulating layer's position that is not stripped off in the shape of a step. Consequently, when the stress-relief-cone portion is formed, the jointing-structure-forming portion of the superconducting-cable core of the present invention is defined as at least the range from the end of the superconducting-cable core to the starting-up position of the stress-relief cone. Of the superconducting-cable core, the portion other than the above-described jointing-structure-forming portion is the cable portion.

The reason why the jointing-structure-forming portion located at the end portion of the superconducting cable can be formed with an insulating structure different from that of the cable portion as described above is that in the case of a superconducting cable, the position of the end portion of the cable to be used for the formation of the joint can be determined in advance.

For a normal-conduction cable, the cable can be cut at any desired position to form a joint. Consequently, the cable is not produced in exact agreement with the unit length of the cable line. In other words, the position of the end portion of the cable for forming the joint is not necessarily determined at the time the cable is shipped. On the other hand, a superconducting cable is usually provided with a heat-insulated pipe, which has a vacuum heat-insulating structure. If this heat-insulated pipe is cut at any desired position, the vacuum condition cannot be maintained. Therefore, a superconducting cable is produced with a length in exact agreement with the unit length of the line. In other words, for a superconducting cable, the position of the end portion of the cable for forming the joint is determined in advance. As a result, the electric insulation performance of the end portion of the cable to be used for forming the joint can be easily changed from that of the other portion.

By designing the jointing-structure-forming portion of the cable core in such a way that it has an electric insulation performance higher than that of the cable portion, the joint can have a further increased margin in design when the joint is formed.

To achieve a design in which the jointing-structure-forming portion of the superconducting-cable core has an electric insulation performance higher than that of the cable portion, it is recommended that, for example, (a) the thickness of the insulating layer of the jointing-structure-forming portion be increased to secure the insulation distance between the superconducting conductor and the outer conductor layer and (b) the stress-relief-cone portion of the complementary insulating structure be formed so as to avoid the concentration of the electric field.

In the case of (a) above, the most simple design may be to additionally lap tape-shaped insulating members into the insulating layer of the jointing-structure-forming portion. This structure enhances the electric insulation performance of the end portion of the cable. Consequently, when a joint is formed, the joint can have a further increased margin in insulation design.

In the case of (b) above, a typical example is to place, at the position directly on the superconducting conductor, an insulating layer having a dielectric constant $\in$, higher than that of the other portion. More specifically, the insulating layer is divided into a main insulating layer and an inner insulating layer, which is placed directly on the superconducting conductor and has a dielectric constant higher than that of the main insulating layer.

The above-described structure can relieve the electric stress at the insulating layer's position that is located close to the conductor and therefore is subject to a high-intensity electric field. Accordingly, the joint of the cable can have a further increased margin on account of the insulation design of the stress relief cone. In addition, it is desirable that the main insulating layer be divided into layers having different dielectric constants to arrange them such that the dielectric constant, $\in$, varies, from the position directly on the superconducting conductor, in the order of high, middle, and low values. This arrangement is known as an $\in$ grading.

When power transmission is performed by using a power cable (a superconducting cable or normal-conduction cable), a negative-polarity lightning impulse or switching impulse may be applied to the cable line, so that the maximum intensity of the electric field appears at the position directly under the outer conductor layer (the shielding layer) provided on the outer circumference of the insulating layer. Consequently, it is desirable that the superconducting-cable core of the present invention have a structure designed by taking the above-described possibility into consideration. For example, in addition to the inner insulating layer, an outer insulating layer having a dielectric constant, $\in$, higher than that of the main insulating layer may be provided at the position on the outer circumference of the insulating layer and directly under the outer conductor layer. In the case where both the inner insulating layer and the outer insulating layer are provided to form the $\in$ grading, it is desirable that the inner insulating layer, main insulating layer, and outer insulating layer have a dielectric constant, $\in$, of a high value, middle value, and high value, respectively. Furthermore, the main insulating layer may be divided into a plurality of layers to perform an $\in$ grading.

Moreover, the cable core of the present invention may be applied to both a DC superconducting cable and an AC superconducting cable. For a superconducting cable intended to be used for the DC transmission, it is desirable that the inner insulating layer at the position directly on the superconducting conductor have a resistivity, $\rho$, different from that of other portions of the insulating layer (for example, the main insulating layer). The inner insulating layer directly on the superconducting conductor may have a resistivity, $\rho$, either lower than or higher than that of other portions. It is essential only that the resistivity, $\rho$, varies in the shape of a step throughout the insulating layer. In particular, when the inner insulating layer has a resistivity, $\rho$, lower than that of other portions of the insulating layer, the electric field can be smoothed throughout the insulating layer including the inner insulating layer, which is desirable. When an insulating layer having a low resistivity, $\rho$, is formed directly on the superconducting conductor, a typical example is to arrange the resistivity, $\rho$, from the position directly on the conductor, in the order of low, middle, and high values. This arrangement is known as a $\rho$ grading.

The above-described $\rho$ grading may be combined with an $\in$ grading. In this case, for example, a layer having a high $\in$ and a low $\rho$ is placed directly on the conductor, and a layer having a low $\in$ and a high $\rho$ is placed at a position remote from the conductor. A superconducting cable having such a structure can form a superconducting-cable line having a good electric insulation performance both for DC and AC uses. Consequently, once the superconducting-cable line has been installed, the line can be safely operated in both types of transmission. For example, when a line carrying out the AC transmission using the foregoing superconducting cable is to be switched to the DC transmission, it is not necessary to change the cable, of course. Furthermore, it is not necessary to reinforce the joint and the like to improve the electric insulation performance.

To perform the $\in$ grading or $\rho$ grading, the material for the insulating member constituting the individual insulating layers may be changed. As a typical example, when the insulating layer is formed by using tape-shaped insulating members, it is easy to adjust the dielectric constant, $\in$, and the resistivity, $\rho$, in the individual layers. For example, kraft paper increases its $\rho$ and $\in$ when its air impermeability is increased. Ordinary kraft paper has a resistivity, $\rho$, of $10^{14}$ to $10^{17}$ $\Omega$·cm or so at 20° C. and a dielectric constant, $\in$, of 3.2 to 3.7 or so. On the other hand, composite paper produced by laminating a plastic film with kraft paper (for example, PPLP: a registered trademark of Sumitomo Electric Ind., Ltd.) increases its $\rho$ and decreases its $\in$ when the ratio of the plastic to the entire composite paper is increased (PPLP is the abbreviation of polypropylene-laminated paper). For example, when the ratio "k" of the thickness of the plastic film to that of the entire composite paper is 60 percent, the composite paper has a resistivity, $\rho$, of $10^{17}$ to $10^{19}$ $\Omega$·cm or so at 20° C. and a dielectric constant, $\in$, of 2.5 to 3.0 or so. When the foregoing ratio "k" is 80 percent, the composite paper has a resistivity, $\rho$, of $10^{18}$ to $10^{20}$ $\Omega$·cm or so at 20° C. and a dielectric constant, $\in$, of 2.0 to 2.5 or so. It is recommended that an insulating layer having a desired property be formed by taking the above-described characteristics into consideration.

A tape-shaped insulating member additionally lapped into the jointing-structure-forming portion has an effect of improving the electric insulation performance even when the insulation thickness is increased only by the thickness of a single tape. For example, when PPLP having a thickness of about 125 μm is used, even when the inner insulating layer is formed only with this thickness, an improvement in electric insulation performance of the jointing-structure-forming portion is recognized. It is recommended that the number of layers of the additionally lapping tape-shaped insulating members be one to five or so with consideration given to the time and effort for the additional lapping. It is desirable to further increase the number of layers of the tape-shaped insulating members at a portion that is subject to a high electric field. For example, in the case of the inner insulating layer, the portion in the vicinity of the end of the cable core may be formed with a thickness greater than that of the other portion. On the other hand, in the case of the outer insulating layer, the starting-up portion of the stress-relief-cone portion may be formed with an increased thickness.

To adjust the thickness of the insulating layer at the jointing-structure-forming portion, it is recommended that, as a representative example, the width of overlapping of the insulating member be adjusted at the jointing-structure-forming portion. In the above description, the term "the width of overlapping" is used to mean "the width of overlapping between adjacent turns" when a tape-shaped insulating member is helically lapped. Consequently, when the width of overlapping is increased, the overlapped portion of the insulating member is increased. As a result, the thickness of the insulating layer is increased. In this case, when the overlapped portion between the adjacent turns is further overlapped with the end portion of the next adjacent turn, the thickness of the insulating layer is effectively increased.

It is desirable that these insulation-reinforcing portions in the jointing-structure-forming portion be formed at the time the cable is produced. The performing of the insulation reinforcement at the jointing-structure-forming portion in advance enables not only the performing of the insulation reinforcement for a portion where it is practically impossible to perform the insulation reinforcement at the cable-installation site but also the reducing of the insulation-reinforcing operation at the installation site. When the main insulating layer is formed by helically lapping tape-shaped insulating members, in order to form the inner insulating layer under the main insulating layer at the installation site of the superconducting-cable line, it is necessary to unlap the main insulating layer. In this case, when the insulating layer is relapped after it is unlapped, a gap may develop between constituting layers or a wrinkle may occur in constituting layers, so that the electric insulation performance is reduced. In particular, the main insulating layer is formed by helically lapping a great number of constituting layers. Therefore, it is practically impossible to form the inner insulating layer at the installation site. At the time of the production of the cable, it is easy to perform the insulation reinforcement at the above-described portion.

When the jointing-structure-forming portion is insulation-reinforced as described above, only the jointing-structure-forming portion increases the diameter. Nevertheless, in the core of the present invention, even when the core increases its diameter locally, it is not necessary to increase the diameter of the cable (the heat-insulated pipe) when the superconducting cable is structured. The main reason of that is described below.

(a) In the Case of Multiple Cores, it is Easy to Adjust the Spacing Between the Cores at the End Portion.

Usually, in a multicore superconducting cable, the twisted cable cores have a slack in the twisting to absorb the contraction of the cores resulting from the cooling at the time of the operation of the cable. Therefore, it is easy to adjust the spacing between the cores at the end portion of the cable. Even when the core diameter is increased to a certain extent due to the performing of the insulation reinforcement only at the end portion of the cable, the spacing between the cores at the end portion of the cable can be decreased, so that the increase in the diameter of the enveloping circle of all cores can be avoided. As a result, the increase in the diameter of the heat-insulated pipe that houses these cores can be evaded.

(b) It is not Necessary to have a Vacuum Heat-Insulating Structure at the End Portion of a Superconducting Cable.

When a superconducting cable is installed in a duct, usually, a pulling eye is attached to the end of the cable to bring the cable into the duct by pulling the pulling eye. An auxiliary pipe is added to the end of the heat-insulated pipe, and the pulling eye is fixed to the auxiliary pipe in many cases. In this case, the auxiliary pipe is not required to have a vacuum heat-insulating structure. It needs only to have a single pipe. Consequently, when the auxiliary pipe is placed in line with the outer pipe of the heat-insulated pipe, the inside of the auxiliary pipe can secure a space larger than that of the inside of the heat-insulated pipe, which has a dual-pipe structure. As a result, even when the end portion of the core or cores has a locally increased diameter due to the insulation reinforcement, the end portion of the core or cores can be housed in the auxiliary pipe without altering the diameter of the heat-insulated pipe.

In view of the above-described circumstances, when a superconducting cable is structured by providing a heat-insulated layer that is placed around the outside of the superconducting-cable core or cores and that has a dual-pipe structure, it is desirable that the jointing-structure-forming portion be structured so as to protrude from the end of the dual pipe. When the jointing-structure-forming portion protrudes from the end of the heat-insulated layer having a dual-pipe structure, it is easy to perform both the adjustment of the spacing between the cores at the end portion of the cable and the securing of the space for housing the jointing-structure-forming portion.

The superconducting-cable core of the present invention can be used not only for a multicore cable but also for a single-core cable.

Effect of the Invention

According to the superconducting-cable core of the present invention, by locally insulation-reinforcing the jointing-structure-forming portion located at the end portion of the cable core, the electric insulation performance of an intermediate joint and termination joint can be improved considerably. Consequently, a remarkably enhanced safety can be secured throughout a superconducting-cable line incorporating the foregoing superconducting-cable core. In particular, it is not necessary to increase the core diameter over the entire length of the core, so that the cable (the heat-insulated pipe) is not required to increase its diameter. As a result, the workability at the time the cable is brought into the duct is not hampered.

BRIEF DESCRIPTION OF THE DRAWING

FIGS. 4A and 4B are each a partial cross-sectional view showing an intermediate joint of the superconducting-cable line in Example 1, in which FIG. 4A shows a schematic structural diagram and FIG. 4B shows a partial cross-sectional view of FIG. 4A.

EXPLANATION OF THE SIGN

Figure 1:
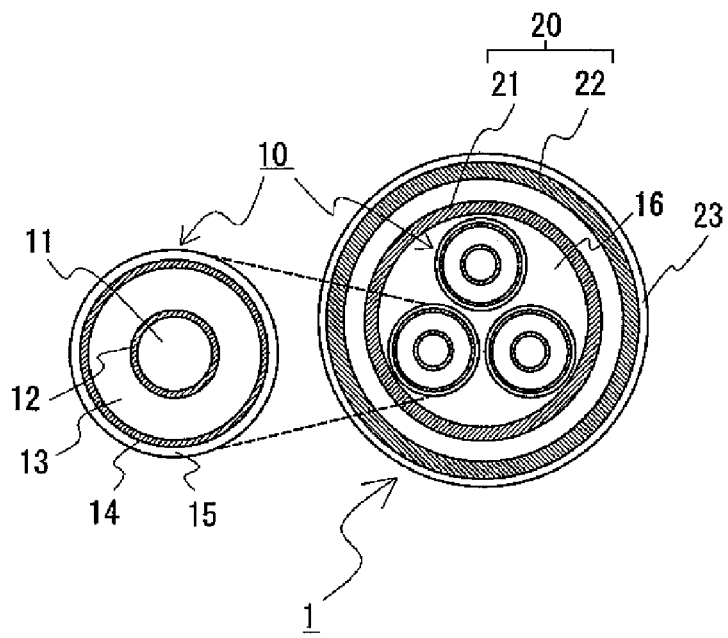
FIG. 1 is a cross-sectional view of a superconducting cable.

1: Superconducting cable; 10: Superconducting-cable core 10$k$: Cable portion; 10$c$: Jointing-structure-forming portion; 11: Former; 12: Superconducting conductor; 13: Insulating layer; 14: Outer conductor layer; 15: Protecting layer; 20: Heat-insulated pipe; 21: Inner pipe of the heat-insulated pipe; 22: Outer pipe of the heat-insulated pipe; 23: Anticorrosion covering; 50: Auxiliary pipe; 51: Space; 100: Pulling eye; 101: Core-fixing portion; 30: Intermediate joint; 31: complementary insulating layer; 31$p$: Stress-relief-cone portion 32: Jointing member; 13$p$: Penciling-down portion; 13$a$: Inner insulating layer; 13$b$: Main insulating layer; and 13$c$: Outer insulating layer.

BEST MODE FOR CARRYING OUT THE INVENTION

Embodiments of the present invention are explained below. In the explanation of the drawing, the same sign is given to the same element to avoid duplicated explanations. The ratios of the dimensions in the drawing do not necessarily coincide with those of the explanation.

Example 1

In this example, an explanation is given, based on FIGS. 1 to 4, both for a superconducting cable that has a high-dielectric-constant layer directly on the superconducting conductor at the end portion of the superconducting-cable core and for a superconducting-cable line incorporating the foregoing superconducting cable.

A superconducting cable to be used in this example is, as shown in FIG. 1, a three-core-bundled-type superconducting cable 1, which has a structure in which three superconducting-cable cores 10 are twisted together and housed in a heat-insulated pipe 20.

Each of the superconducting-cable cores 10 comprises, from the center in the following order, a former 11, a superconducting conductor 12, an insulating layer 13, an outer conductor layer 14, and a protecting layer 15. The former 11 was a former having a stranded-wire structure that was formed by stranding a plurality of insulated copper unit wires. The superconducting conductor 12 and the outer conductor layer 14 were formed by using Bi-2223-based Ag—Mn-alloy-sheathed tape-shaped wires each having a thickness of 0.24 mm and a width of 3.8 mm. The superconducting conductor 12 was formed by helically winding the tape-shaped wires in multiple layers on the former 11. The insulating layer 13 was formed by helically lapping PPLP having a thickness of 125 μm and a width of 20 mm, in multiple layers, on the outer circumference of the superconducting conductor 12 (PPLP is a registered trademark of Sumitomo Electric Ind., Ltd.). The outer conductor layer 14 was formed by helically winding the sheathed tape-shaped wires in multiple layers on the outer circumference of the insulating layer 13. Although not shown, an inner semiconducting layer is formed between the superconducting conductor 12 and the insulating layer 13, and an outer semiconducting layer is formed between the insulating layer 13 and the outer conductor layer 14.

Figure 2:
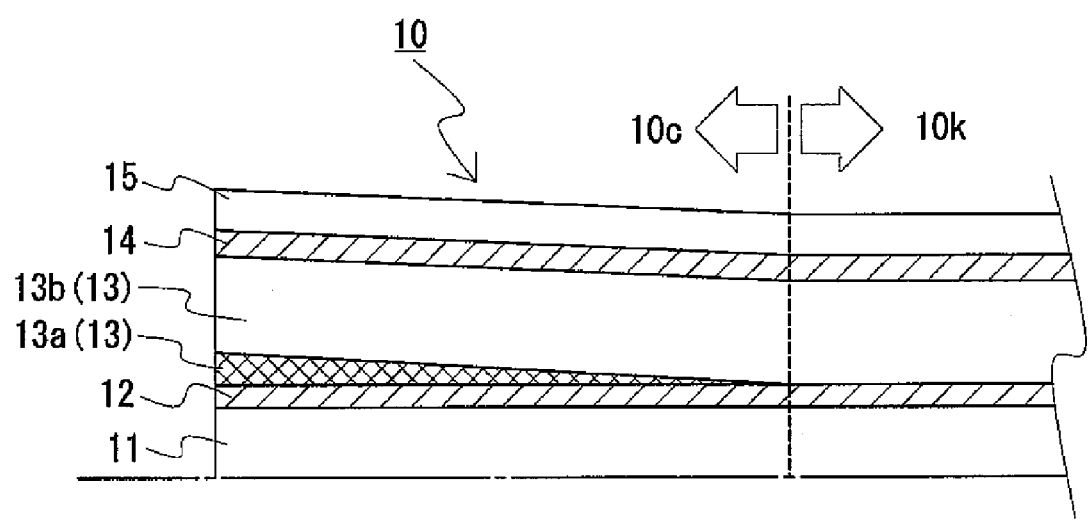
FIG. 2 is a partial cross-sectional view showing an end portion of the superconducting-cable core in Example 1.

In both end portions of the superconducting-cable core (the jointing-structure-forming portions), an inner insulating layer was formed directly on the superconducting conductor (when the inner semiconducting layer is provided, directly on it). The inner insulating layer has a dielectric constant, $\in$, higher than that of the insulating layer and a resistivity, $\rho$, lower than that of the insulating layer. FIG. 2 is a partial cross-sectional view that enlarges an end portion of the superconducting-cable core 10. The intermediate portion of the superconducting-cable core 10 (the right-hand side of a dashed line at the center in FIG. 2) is a cable portion 10$k$, in which the former 11, the superconducting conductor 12, the insulating layer 13, the outer conductor layer 14, and the protecting layer 15 all have a uniform thickness along the entire length. On the other hand, an end portion of the superconducting-cable core 10 (the left-hand side of the dashed line in FIG. 2) is a jointing-structure-forming portion 10$c$, in which an inner insulating layer 13$a$ is provided directly on the superconducting conductor 12. In the jointing-structure-forming portion 10$c$, the layers other than the inner insulating layer 13$a$ have a uniform thickness along the length of the cable core 10. A main insulating layer 13$b$ in the jointing-structure-forming portion 10$c$ is an insulating layer formed continuously from the cable portion 10$k$ and has the same constitution as that of the insulating layer 13.

The relationships of the dielectric constant, $\in$, and the resistivity, $\rho$, between the inner insulating layer 13$a$ and the main insulating layer 13b are shown below. In the following table, the letters "A" and "B" indicate constants.

|  | Dielectric constant, $\epsilon$ | Resistivity, $\rho$ (20° C.) ($\Omega \cdot$ cm) |
|---|---|---|
| Inner insulating layer (13a) | About 1.5A | About 0.7B |
| Main insulating layer (13b) | A | B |

The inner insulating layer 13a is a layer of PPLP helically lapped such that the thickness increases gradually toward the end of the cable core 10. The PPLP has a dielectric constant, $\in$, different from that of the PPLP for forming the main insulating layer 13b. More specifically, the thickness of the inner insulating layer 13a at the starting-up position in the jointing-structure-forming portion 10c is equal to that of one sheet of PPLP (about 125 μm). The thickness of the inner insulating layer 13a at the end of the jointing-structure-forming portion 10c is equal to that of five sheets of PPLP (about 625 μm). The thickness of the inner insulating layer 13a at individual positions is not limited to the above-described thickness. It is recommended that the thickness be properly selected so that the concentration of the electric field at the joint can be relieved to secure a desired margin.

The formation of the inner insulating layer 13a, which has a high dielectric constant, $\in$, directly on the superconducting conductor 12 can relieve the electric field in the vicinity of the superconducting conductor 12, where the intensity of the electric field is high.

On the other hand, the heat-insulated pipe 20, which houses the superconducting-cable cores 10, has a dual-pipe structure composed of an inner pipe 21 and an outer pipe 22 (see FIG. 1). A heat-insulating material, such as Superinsulation, is placed between the inner pipe 21 and the outer pipe 22. A space 16 enclosed by the inner pipe 21 and the above-described cable cores 10 becomes a channel for a coolant. A partition is formed at the end of the heat-insulated pipe 20 to seal the space between the inner pipe 21 and the outer pipe 22. The space is evacuated in a vacuum to form a heat-insulating layer. An anticorrosion covering 23 is formed on the outer circumference of the outer pipe 22.

Figure 3:
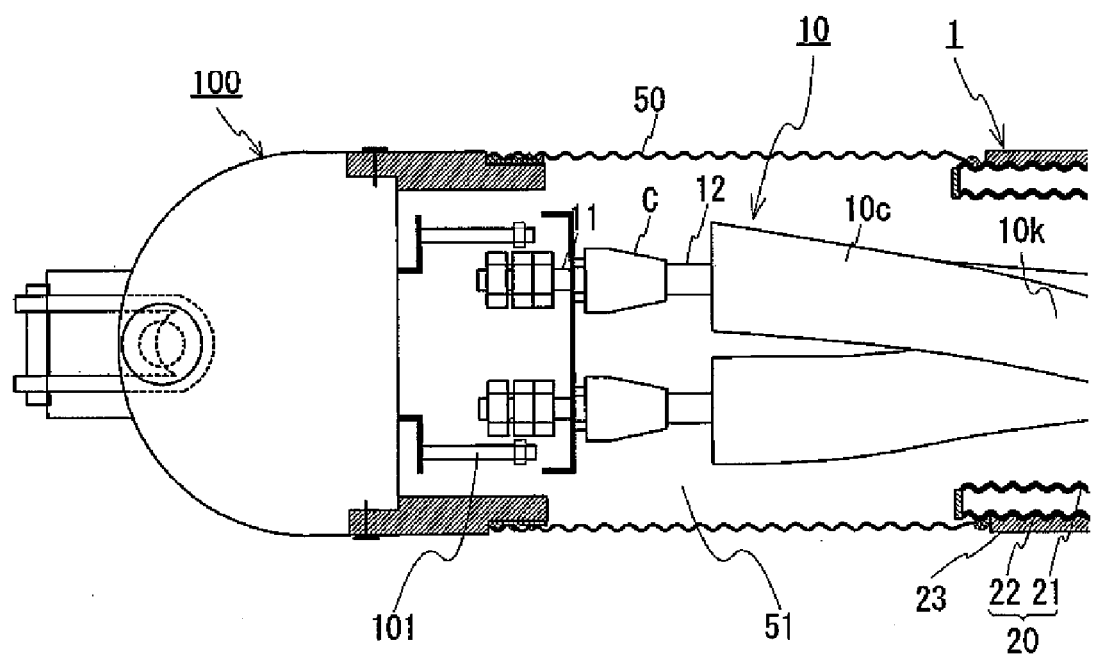
FIG. 3 is an illustration showing a state in which a pulling eye is attached to the end of the superconducting cable in Example 1.

A pulling eye is attached to the end of the foregoing superconducting cable to bring the cable into a duct by pulling the pulling eye. FIG. 3 is a partially enlarged diagram showing the end portion of the superconducting cable 1 to which a pulling eye 100 is attached. Although FIG. 3 shows only two cable cores, actually, there exist three cores.

The end portions of the cable cores 10, i.e., the jointing-structure-forming portions 10c, were brought into a state where they protruded from the end of the heat-insulated pipe 20 composed of the inner pipe 21 and the outer pipe 22. An auxiliary pipe 50 was placed so as to cover the outer circumferences of the protruding jointing-structure-forming portions 10c. One end of the auxiliary pipe 50 was fixed to the outer pipe 22, and the other end was used to attach the pulling eye 100. When the pulling eye 100 was attached, the end portions of the jointing-structure-forming portions 10c protruding from the end of the heat-insulated pipe 20 were each stripped off in the shape of a step to finally expose the conductor. Each of the exposed end portions of the superconducting conductors 12 was covered with a cap "C" not only to protect it but also to pre-vent it from becoming loose. The formers 11 were fixed to core-fixing portions 101 of the pulling eye 100. The above-described structure was employed with the intention of performing the sharing of the tension for pulling the cable core 10 mainly with the heat-insulated pipe 20, which was connected to the auxiliary pipe 50, and the formers 11.

The auxiliary pipe 50, to which the pulling eye 100 was to be attached, was not required to have a dual-pipe structure. Consequently, the auxiliary pipe 50 having an inner diameter almost equal to the outer diameter of the outer pipe 22 was employed. The auxiliary pipe 50 had an internal space 51, which had a diametrical margin in comparison with the internal space of the heat-insulated pipe 20. Therefore, it was possible to house, in the auxiliary pipe 50, the jointing-structure-forming portions 10c, whose diameter was increased by additionally lapping the inner insulating layer. As a result, it was possible to produce the superconducting cable 1 without increasing the diameter of the heat-insulated pipe 20 (the diameter of the superconducting cable 1).

In this case, even when the diameter of the jointing-structure-forming portion 10c is farther increased by further increasing the thickness of the inner insulating layer 13a, the jointing-structure-forming portions 10c can be housed in the auxiliary pipe 50 by tightening the loose twisting of the cable cores 10. Even when the twisting of the cable cores is tightened at the above-described position, the cable cores secure a sufficient slack in the twisting as a whole, because the cable portions 10k secure the slack in the twisting.

Next, a superconducting cable brought into a duct by pulling the pulling eye is jointed with another conducting member to form a complementary insulating structure at this joint. More specifically, the types of the joint, in which the complementary insulating structure is formed, include an intermediate joint, which joints a superconducting cable with another superconducting cable, and a termination joint, which joints a superconducting cable with another electric-power apparatus. The structures of the foregoing two joints share common features in basic configuration as follows: (a) the complementary insulating layer is formed by lapping tape-shaped insulating members and (b) the end portion of the insulating layer of the cable core is formed with the shape of a sharpened end portion of a pencil (hereinafter referred to as the "penciling-down" shape). Consequently, an explanation is given only for the intermediate joint by referring to FIGS. 4A and 4B.

Figure 4A:
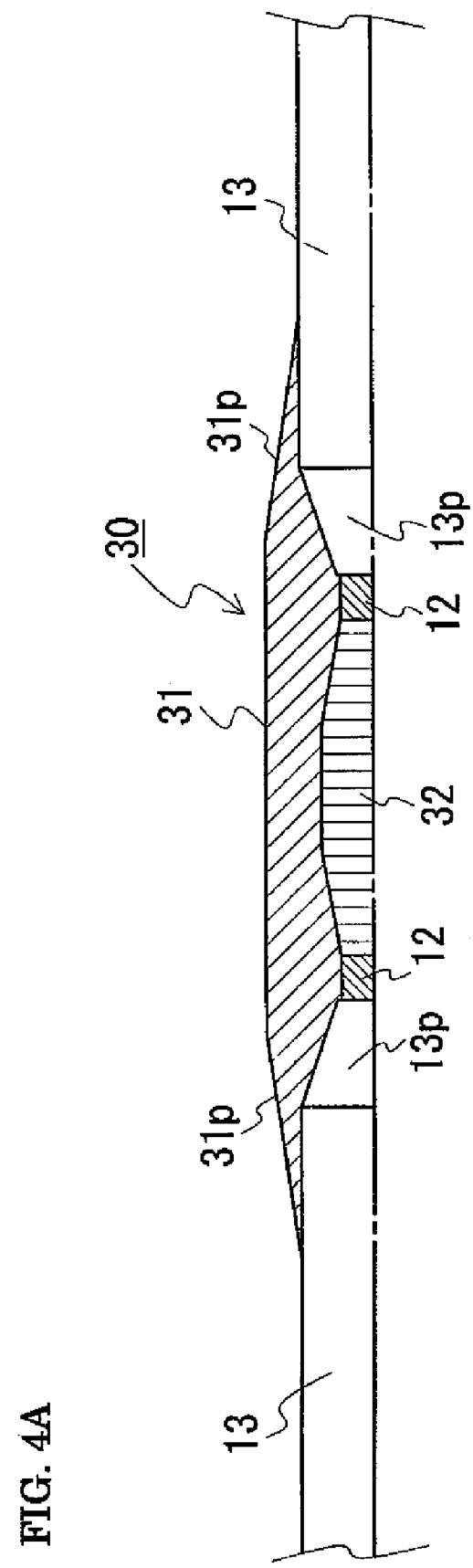
Figure 4B:
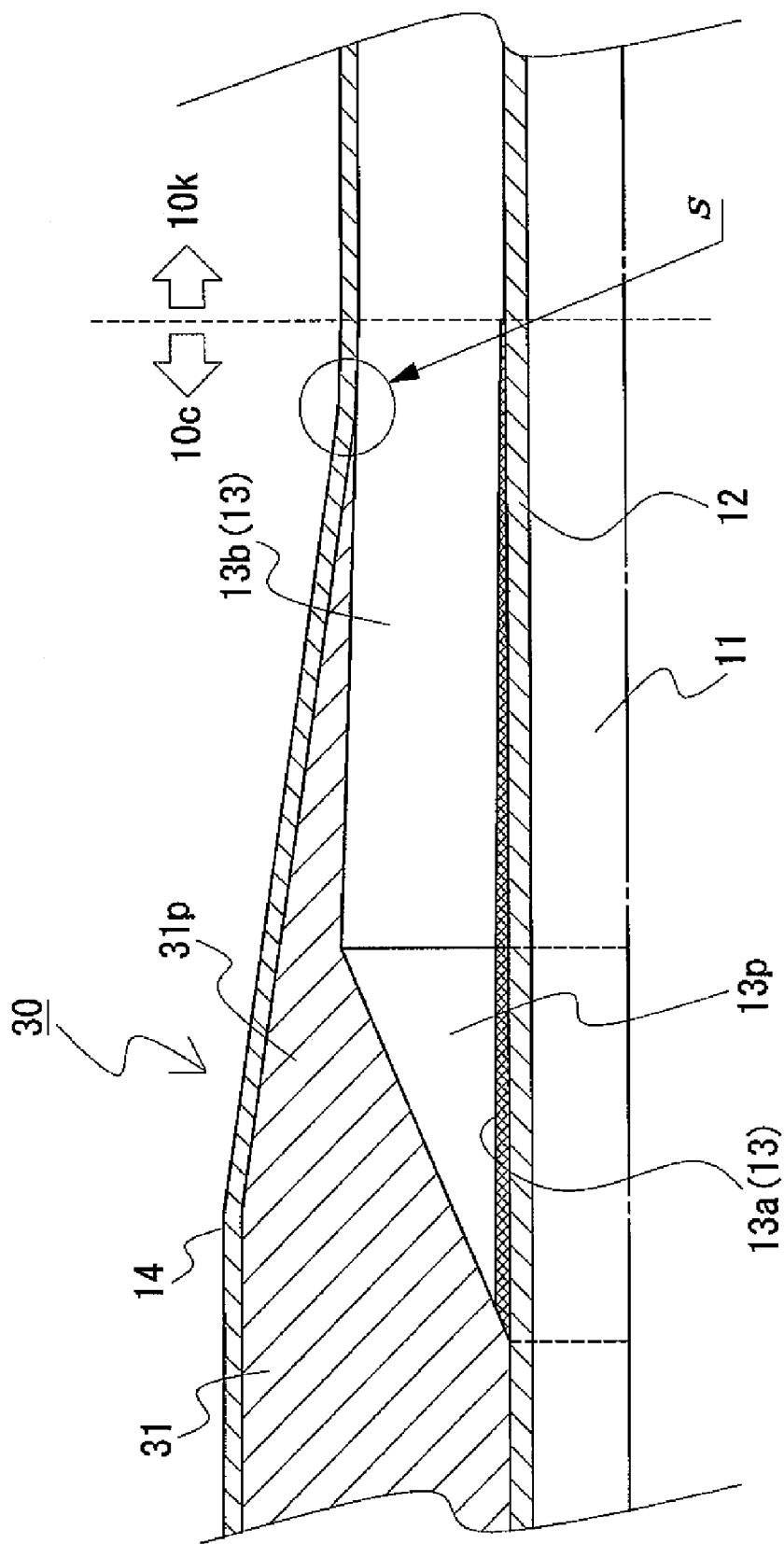

As shown in FIGS. 4A and 4B, an intermediate joint 30 has a structure in which ends of the two superconducting-cable cores are brought into electrical continuity through a jointing member 32, and the vicinity of the outer circumference of the jointing member 32 is covered with a complementary insulating layer 31.

The intermediate joint 30 was formed by the following procedure. First, the end portion of the cable core (the end portion of the jointing-structure-forming portion) is stripped off in the shape of a step. This operation partially exposed the former 11, the superconducting conductor 12, the insulating layer 13, and the outer conductor layer 14. The former 11 and the superconducting conductor 12 were jointed with the other former 11 and superconducting conductor 12, respectively, through the jointing member 32. The end portion of the insulating layer 13 was formed as a penciling-down portion 13p, which had a tapered shape that decreased its diameter toward the end of the core, to relieve the concentration of the electric field at the edge of the insulating layer 13, which was formed by the stripping-off in the shape of a step. In the outer conducting layer 14, the superconducting wires (the sheathed tape-shaped wires) were unwound to the vicinity of the boundary between the cable portion 10k and the jointing-structure-forming portion 10c so that the complementary insulating layer 31 could be formed.

Next, the complementary insulating layer 31 was formed so as to cover the outer circumference of the jointing member 32, the superconducting conductor 12, and the insulating layer 13 (mainly the penciling-down portion 13p). In the complementary insulating layer 31, a stress-relief-cone portion 31p is formed that had a tapered shape that decreases its diameter toward each end of the layer 31. The stress-relief-cone portion 31p has a starting-up position "s," which tends to become a weak point in insulation because the electric field tends to concentrate at this position.

Finally, the unwound outer conducting layers 14 were placed along the outer circumference of the complementary insulating layer 31, and the outer conducting layers 14 of the two cables were jointed with each other.

In the intermediate joint 30 as explained in the above, the providing of the inner insulating layer 13a, having a high dielectric constant, directly on the superconducting conductor 12 can relieve the electric field in the vicinity of the superconducting conductor 12, where the intensity of the electric field is high. Because the electric field is already relieved at this position, the intensity of the electric field can be decreased also at the starting-up position "s" of the stress-relief-cone portion, which is located relatively remote from the superconducting conductor 12.

In addition, the inner insulating layer 13a has a resistivity, $\rho$, lower than that of the main insulating layer 13b. Consequently, when the DC transmission is performed by using the superconducting cable of this example, the electric field can be smoothed with these insulating layers 13a, 13b, and 31 as a whole. Thus, the electric insulation performance of the intermediate joint 30 can be improved. As a result, the reliability of the entire superconducting-cable line can be enhanced.

As described above, the insulating layer 13 is formed by helically lapping the tape-shaped insulating members in multiple layers. Consequently, it is very difficult to unlap the insulating layer 13 (the main insulating layer 13b), which is helically lapped in multiple layers, at the installation site of the superconducting cable. However, the superconducting-cable core 10 of the present invention has the inner insulating layer 13a formed directly on the superconducting conductor 12 in advance. Therefore, the necessity of unlapping the insulating layer (the main insulating layer 13b) can be eliminated when a superconducting-cable line is installed.

Example 2

In this example, an explanation is given for a superconducting-cable core that has, directly under the outer conductor layer, an insulating layer (an outer insulating layer) having a dielectric constant, $\in$, and a resistivity, $\rho$, both higher than those of the insulating layer 13, in addition to the structure employed in Example 1. When an outer semiconducting layer is provided in the superconducting-cable core, the outer insulating layer is provided directly under the outer semiconducting layer. The superconducting-cable core in this example has the same structure as that of the superconducting-cable core in Example 1, except that the outer insulating layer is provided. Consequently, the explanation is given only for the different aspects.

Figure 5:
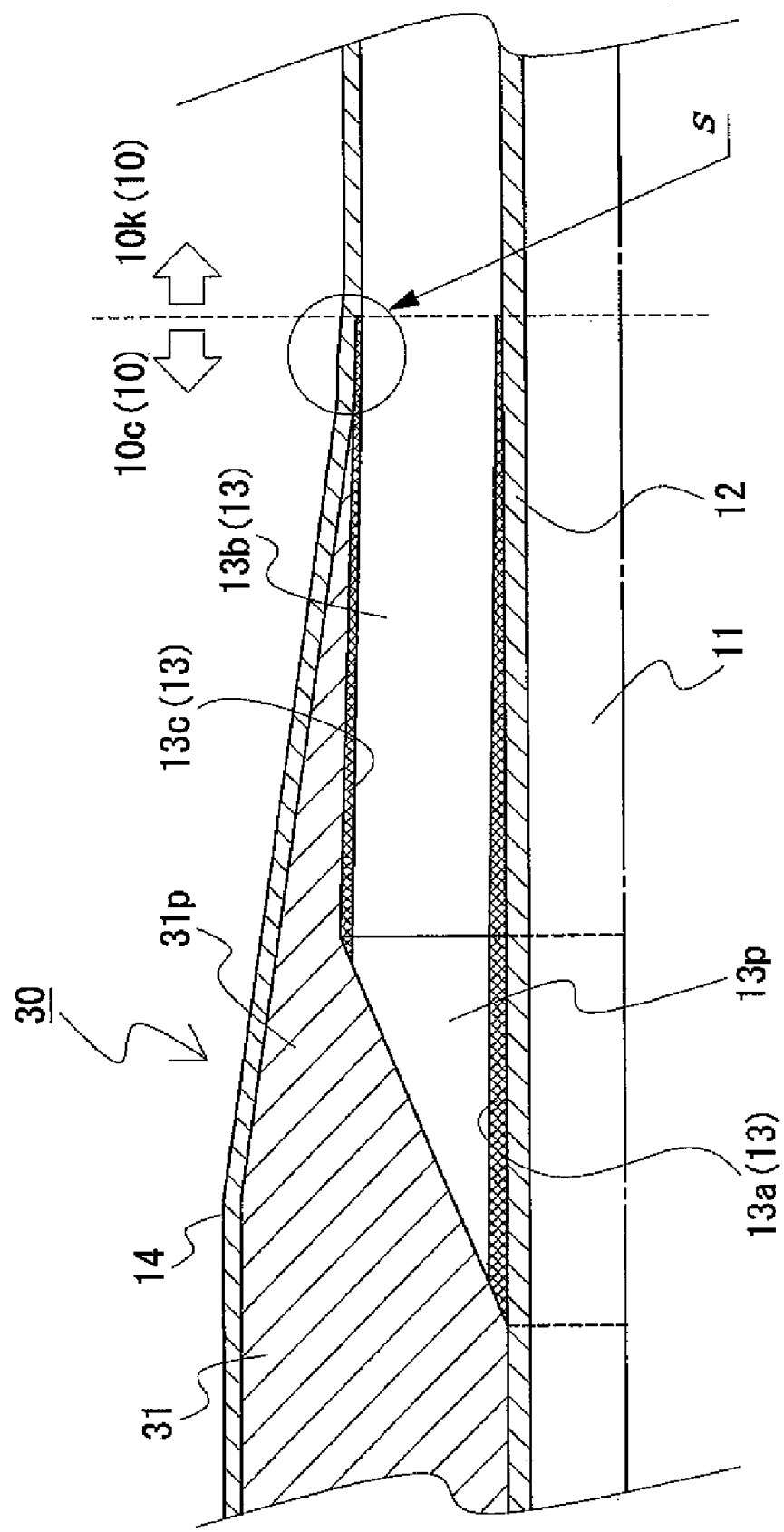
FIG. 5 is a partial cross-sectional view showing an intermediate joint of the superconducting-cable line in Example 2.

FIG. 5 is a partial cross-sectional view showing an intermediate joint using a superconducting-cable core in this example. As shown in FIG. 5, the superconducting-cable core 10 has an outer insulating layer 13c between the main insulating layer 13b and the outer conductor layer 14. As with the inner insulating layer 13a, the outer insulating layer 13c is formed such that the thickness increases gradually from the boundary between the cable portion 10k and the jointing-structure-forming portion 10c toward the end of the cable core 10. The forming of the outer insulating layer 13c in such a way that it increases the thickness toward the end of the cable core can be easily achieved by adjusting the width of overlapping at the time the PPLP (a registered trademark) is helically lapped.

The dielectric constant, $\in$, and the resistivity, $\rho$, of the above-described individual insulating layers 13a to 13c are shown below. In the following table, the letters "A" and "B" indicate constants.

|  | Dielectric constant, $\epsilon$ | Resistivity, $\rho$ (20° C.) ($\Omega \cdot$ cm) |
|---|---|---|
| Inner insulating layer (13a) | About 1.5A | About 0.8B |
| Main insulating layer (13b) | A | B |
| Outer insulating layer (13c) | About 1.5A | About 1.2B |

As described above, the dielectric constant, $\in$, varies from a high value to a middle value and again to a high value as the position moves from the superconducting conductor 12 toward the outer conductor layer 14. Consequently, the electric field can be relieved not only at the position of the inner insulating layer 13a but also at the position of the outer insulating layer 13c. In addition, because of the presence of the outer insulating layer 13c, even when the polarity is reversed, i.e., even when the electric field is formed from the outer conductor layer 14 to the superconducting conductor 12, the electric field can be relieved effectively.

On the other hand, the resistivity, $\rho$, varies from a low value to a middle value to a high value as the position moves from the superconducting conductor 12 toward the outer conductor layer 14. Consequently, when the DC transmission is performed by using the superconducting-cable line of this example, the electric field distribution in DC voltage can be smoothed in the direction of the thickness of the insulating layer. In addition, even if a negative-polarity lightning impulse or switching impulse is applied to the cable line and the maximum intensity in the electric field appears at the position directly under the outer conductor layer 14 provided at the outer circumference of the insulating layer, the cable insulation can withstand the maximum intensity in the electric field on account of the outer insulating layer 13c, having a high resistivity, $\rho$.

Modified Example 2-1

In this example, an explanation is given for a superconducting-cable line in which the thickness of the outer insulating layer is varied in the structure used in Example 2. This line is the same as the line in Example 2 except that the structure of the outer insulating layer of the superconducting-cable core is different. Consequently, the explanation is given only for the different aspects by referring to FIG. 6.

Figure 6:
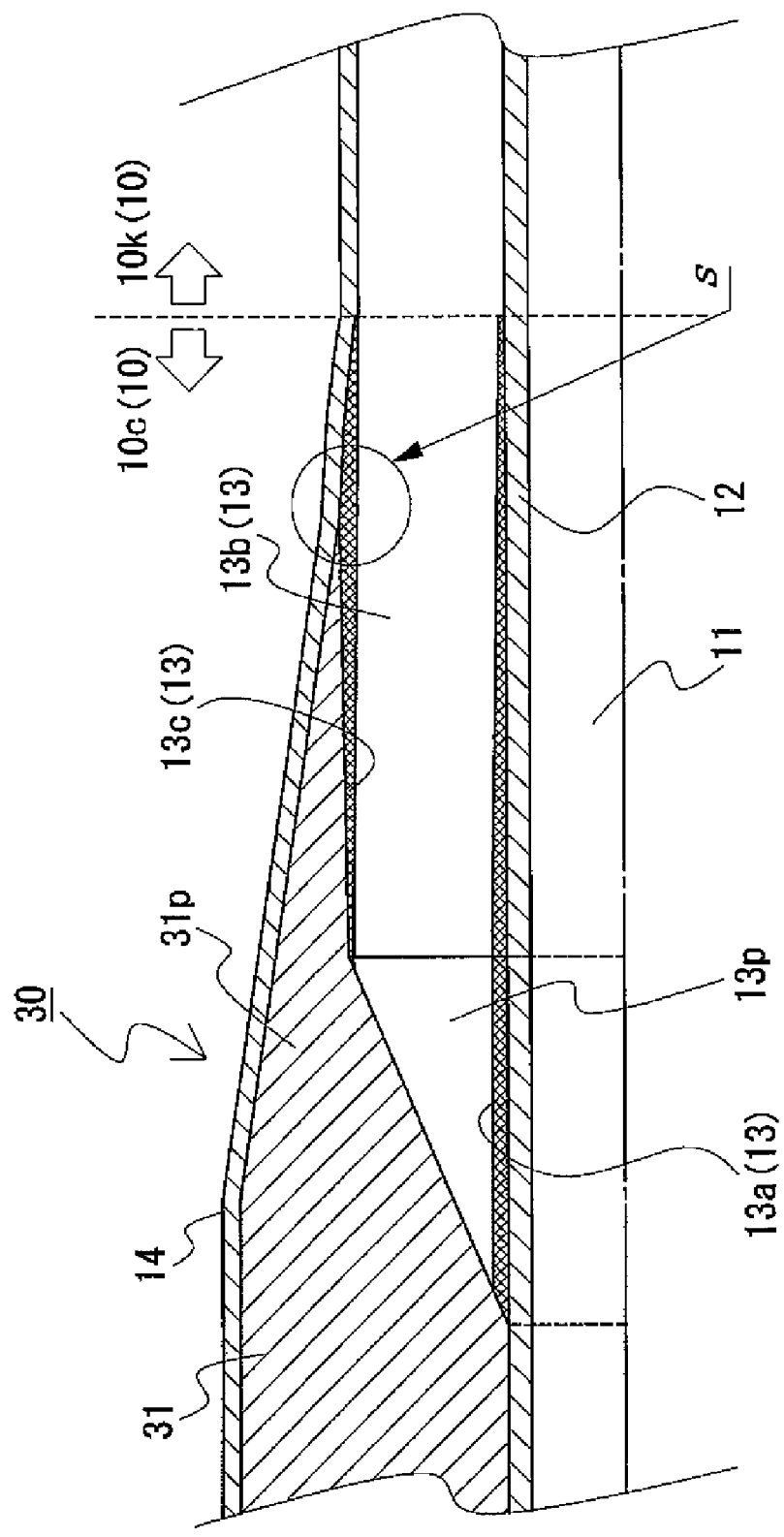
FIG. 6 is a partial cross-sectional view showing an intermediate joint of the superconducting-cable line in Modified example 2-1.

FIG. 6 is a partial cross-sectional view showing the vicinity of an intermediate joint using the superconducting cable (core) of this example. As shown in FIG. 6, the outer insulating layer 13c of this example is formed such that its thickness increases gradually from the end portion of the superconducting-cable core 10 toward the cable portion 10k but has the maximum value at the position of the starting-up position "s" of the stress-relief-cone portion 31p. Then, the thickness decreases gradually from the starting-up position "s" toward the boundary between the jointing-structure-forming portion 10c and the cable portion 10k. In this case, it is recommended that the outer insulating layer 13c be formed such that it is free from any abrupt diameter change at the stress-relief-cone portion 31p.

The above-described structure can effectively relieve the electric field at the starting-up position "s," at which the electric field has a pronounced tendency to concentrate in the complementary insulating layer 31. As a result, a joint having a further enhanced reliability can be formed.

INDUSTRIAL APPLICABILITY

A superconducting cable having a superconducting-cable core of the present invention can be installed in an existing duct and can be suitably used in a highly reliable superconducting-cable line. In addition, a superconducting-cable line of the present invention can be suitably used in both the AC transmission and DC transmission.

The invention claimed is:

1. A superconducting-cable core, comprising a superconducting conductor and an insulating layer covering the outer circumference of the superconducting conductor;
   the superconducting-cable core being classified longitudinally into a cable portion and a jointing-structure-forming portion that is located at each end of the cable portion and that serves as the portion in which a complementary insulating structure is formed when jointed with another conducting member;
   of the superconducting-cable core, the jointing-structure-forming portion being at least within the range from the end of the superconducting-cable core to the end of the complementary insulating structure;
   the jointing-structure-forming portion having an insulating layer whose electric insulation performance is higher than that of the insulating layer of the cable portion, wherein:
   (a) the insulating layer of the jointing-structure-forming portion is provided with a main insulating layer and an inner insulating layer placed between the main insulating layer and the superconducting conductor; and
   (b) the inner insulating layer has a dielectric constant higher than that of the main insulating layer.

2. A superconducting-cable core as defined by claim 1, wherein the jointing-structure-forming portion is further provided with an outer insulating layer that is placed on the outer circumference of the main insulating layer and that has a dielectric constant higher than that of the main insulating layer.

3. A superconducting-cable core as defined by claim 1, wherein:

(a) the insulating layer is formed by helically lapping tape-shaped insulating members in multiple layers; and
(b) the jointing-structure-forming portion has at least one portion in which the insulating layer is formed such that it has a thickness larger than that of the other portions of the jointing-structure-forming portion.

4. A superconducting-cable core as defined by claim 1, wherein:

(a) the insulating layer is formed by helically lapping tape-shaped insulating members in multiple layers; and
(b) the jointing-structure-forming portion has at least one portion in which the insulating layer is formed such that it has a thickness larger than that of the other portions.

5. A superconducting-cable core as defined by claim 2, wherein:

(a) the insulating layer is formed by helically lapping tape-shaped insulating members in multiple layers; and
(b) the jointing-structure-forming portion has at least one portion in which the insulating layer is formed such that it has a thickness larger than that of the other portions.

6. A superconducting-cable core as defined by claim 3, wherein the jointing-structure-forming portion has an insulating layer whose thickness is adjusted by increasing the width of overlapping between the turns of adjacent insulating members.

7. A superconducting-cable core as defined by claim 4, wherein the jointing-structure-forming portion has an insulating layer whose thickness is adjusted by increasing the width of overlapping between the turns of adjacent insulating members.

8. A superconducting-cable core as defined by claim 5, wherein the jointing-structure-forming portion has an insulating layer whose thickness is adjusted by increasing the width of overlapping between the turns of adjacent insulating members.

9. A superconducting cable, comprising:
   (a) a superconducting-cable core as defined by claim 1; and
   (b) a heat-insulated layer that is placed on the outer circumference of the superconducting-cable core and that has a dual-pipe structure;
   the superconducting cable being structured such that the jointing-structure-forming portion protrudes from the end of the dual pipe.

10. A superconducting-cable line, being:
    (a) installed by using a superconducting cable as defined by claim 9; and
    (b) either a DC superconducting-cable line or an AC superconducting-cable line.

* * * * *